US011847123B2

(12) United States Patent
Vale et al.

(10) Patent No.: US 11,847,123 B2
(45) Date of Patent: Dec. 19, 2023

(54) SYSTEM AND METHOD FOR KNOWLEDGE RETRIEVAL USING ONTOLOGY-BASED CONTEXT MATCHING

(71) Applicant: Tata Consultancy Services Limited, Mumbai (IN)

(72) Inventors: Sushant Shrinivas Vale, Pune (IN); Raghavendra Reddy Yeddula, Pune (IN); Sreedhar Sannareddy Reddy, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 60 days.

(21) Appl. No.: 17/655,721

(22) Filed: Mar. 21, 2022

(65) Prior Publication Data

US 2022/0342891 A1 Oct. 27, 2022

(30) Foreign Application Priority Data

Mar. 22, 2021 (IN) .............................. 202121012276

(51) Int. Cl.
  *G06F 16/2457* (2019.01)
  *G06F 16/28* (2019.01)

(52) U.S. Cl.
  CPC ...... *G06F 16/24573* (2019.01); *G06F 16/285* (2019.01)

(58) Field of Classification Search
  CPC ............. G06F 16/7335; G06F 16/3338; G06F 16/532; G06F 16/24573; G06F 16/285
  See application file for complete search history.

(56) References Cited

U.S. PATENT DOCUMENTS 9,977,817 B2 * 5/2018 Gallé .................... G06F 16/25
2007/0260595 A1 * 11/2007 Beatty .................. G06F 16/907
  707/999.005

(Continued)

FOREIGN PATENT DOCUMENTS

CN 108959613 A 12/2018

OTHER PUBLICATIONS

Erwin Marsi et al., "Automatic Tree Matching for Analysing Semantic Similarity in Comparable Text," Essential Speech and Language Technology for Dutch, Nov. 2012, pp. 129-145 Springer, https://www_researchgate.net/publication/259034985_Automatic_Tree_Matching_for_Analysing_SemanticSimilarity_in_Comparable_Text/link/55c1fed708aeb5e0c584d1c6/download.

(Continued)

*Primary Examiner* — Sherief Badawi
*Assistant Examiner* — William P Bartlett
(74) *Attorney, Agent, or Firm* — Finnegan, Henderson, Farabow, Garrett & Dunner, LLP

(57) ABSTRACT

The disclosure relates generally to knowledge retrieval using ontology-based context matching. Conventional knowledge retrieval methods and systems are based on generative context that is modeled loosely as some meta data annotations. The meta data annotations do not provide sufficient semantic basis for meaningful context matching, compromising safety aspect. Other typical systems are designed such that the context is encoded into knowledge elements themselves, thus matching is too strict and the knowledge can only be used in contexts that match exactly, compromising the reuse aspect. The disclosed method and system explicitly models the context in which knowledge is generated, and matches the problem context with the generative context of knowledge, with respect to the underlying domain ontology, to assess the degree of similarity between the two, (Continued)

which then provides the basis for ranking the suitability of different knowledge elements for the problem context.

17 Claims, 10 Drawing Sheets

(56) References Cited

U.S. PATENT DOCUMENTS

2015/0286713 A1\* 10/2015 Zhang .................. G06F 16/367
 707/749
2016/0275196 A1\* 9/2016 Lee .................. G06F 16/24522

OTHER PUBLICATIONS

Umberto Straccia et al., "Towards Distributed Information Retrieval in the Semantic Web: Query Reformulation Using the oMAP Framework," The Semantic Web: Research and Applications, 3rd European Semantic Web Conference, Jun. 2006, pp. 378-392, ACM, https://www_researchgate.net/publication/220854070_Towards_Distributed_Information_Retrieval_in_the_Semantic_Web_Query_Reformulation_Using_the_oMAP_Framework/link/09e4150a4ea62dbb14000000/ download.

Jifang Wu et al., "DAEOM: A Deep Attentional Embedding Approach for Biomedical Ontology Matching," Applied Sciences, Nov. 2020, MDPI, https://www.mdpi.com/2076-3417/10/21/7909.

\* cited by examiner

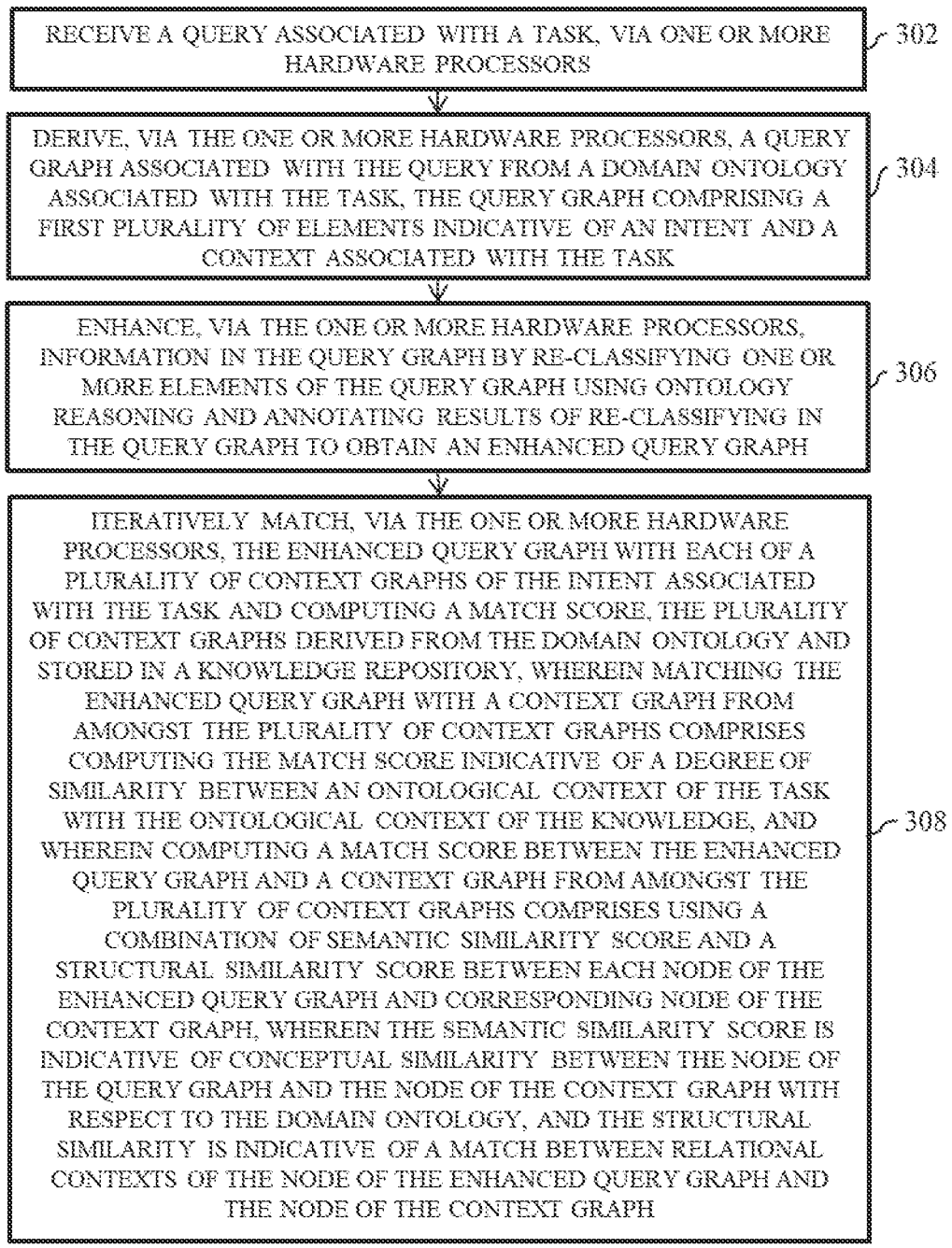
FIG. 3        ← 300

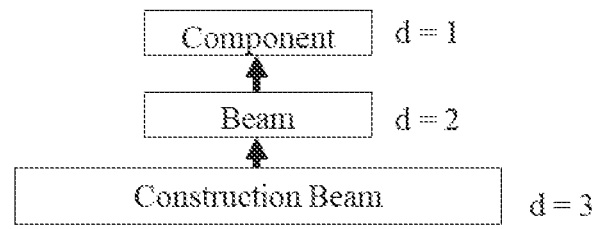
FIG. 6E
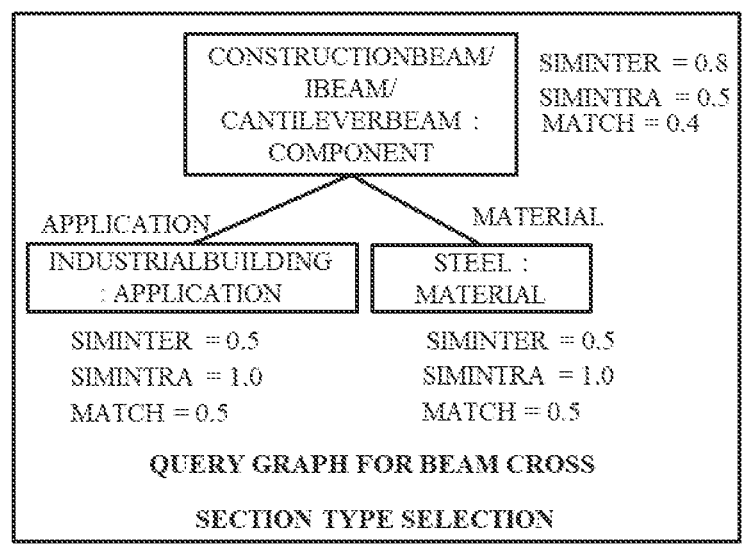
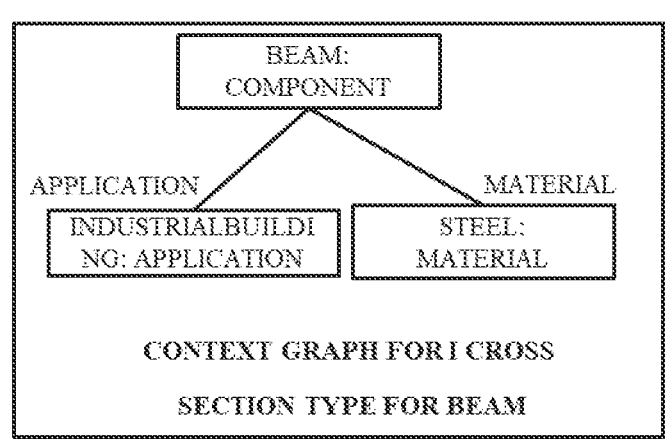
FIG. 6F

SYSTEM AND METHOD FOR KNOWLEDGE RETRIEVAL USING ONTOLOGY-BASED CONTEXT MATCHING

PRIORITY CLAIM

This U.S. patent application claims priority under 35 U.S.C. § 119 to: Indian Patent Application No. 202121012276, filed on Mar. 22, 2021. The entire contents of the aforementioned application are incorporated herein by reference.

TECHNICAL FIELD

The disclosure herein generally relates to the field of knowledge engineering and knowledge, and, more particularly, to system and method for knowledge retrieval using ontology-based context matching.

BACKGROUND

With an enhanced ease of access of internet to the masses, a huge amount of data and information are being generated every day. Retrieving most suitable knowledge from this huge data for a problem or task in accordance with the context of the problem is challenging.

Knowledge is usually generated in a specific context. This context forms the implicit background for the knowledge, and the latter cannot be interpreted correctly without the former. At the same time, one of the goal of knowledge retrieval is to maximize the reuse of knowledge in as many problem contexts as possible.

Existing knowledge retrieval systems typically fall at two extremes: 1) generative context is only modeled loosely as some meta data annotations, or 2) context is encoded into knowledge elements themselves, e.g. as antecedent conditions in rules. Such traditional systems suffer from certain limitations. For example, in the first case, meta data annotations do not provide sufficient semantic basis for meaningful context matching, compromising the safety aspect. In the second case, the matching is too strict, and the knowledge can only be used in contexts that match exactly, compromising the reuse aspect.

It is important to address the aforementioned limitations of the knowledge retrieval (KR) systems in a manner that provide sufficient semantic basis for meaningful context matching and address strict matching problem for supporting the reuse aspect.

SUMMARY

Embodiments of the present disclosure present technological improvements as solutions to one or more of the above-mentioned technical problems recognized by the inventors in conventional systems. For example, in one embodiment, a method for knowledge retrieval using ontology-based context matching is provided. The method includes receiving a query associated with a task, via one or more hardware processors. Further, the method includes deriving a query graph associated with the query from a domain ontology associated with the task, via the one or more hardware processors, the query graph comprising a first plurality of elements indicative of an intent and a context associated with the task, wherein the domain ontology comprises a classification of concepts associated with the task about which knowledge is to be determined. Furthermore, the method includes enhancing information in the query graph by re-classifying one or more elements of the query graph using ontology reasoning and annotating results of re-classifying in the query graph to obtain an enhanced query graph, via the one or more hardware processors. Also, the method includes iteratively matching the enhanced query graph with each of a plurality of context graphs of knowledge for the intent associated with the task and computing a match score, via the one or more hardware processors, the plurality of context graphs derived from the domain ontology and stored along with knowledge in a knowledge repository. Herein, matching the enhanced query graph with a context graph from amongst the plurality of context graphs comprises computing the match score indicative of a degree of similarity between an ontological context of the task with the ontological context of the knowledge. Also, computing a match score between the enhanced query graph and a context graph from amongst the plurality of context graphs comprises using a combination of semantic similarity score and a structural similarity score between each node of the enhanced query graph and corresponding node of the context graph, wherein the semantic similarity score is indicative of conceptual similarity between the node of the query graph and the node of the context graph with respect to the domain ontology, and the structural similarity is indicative of a match between relational contexts of the node of the enhanced query graph and the node of the context graph.

In another aspect, a method for knowledge retrieval using ontology-based context matching is provided. The system includes a memory storing instructions, one or more communication interfaces and one or more hardware processors coupled to the memory via the one or more communication interfaces (503), wherein the one or more hardware processors are configured by the instructions to receive a query associated with a task. The one or more hardware processors are further configured by the instructions to derive a query graph associated with the query from a domain ontology associated with the task, the query graph comprising a first plurality of elements indicative of an intent and a context associated with the task, wherein the domain ontology comprises a classification of concepts associated with the task about which knowledge is to be determined. Further, the one or more hardware processors are configured by the instructions to enhance information in the query graph by re-classifying one or more elements of the query graph using ontology reasoning and annotating results of re-classifying in the query graph to obtain an enhanced query graph. Furthermore, the one or more hardware processors are configured by the instructions to iteratively match the enhanced query graph with each of a plurality of context graphs of knowledge for the intent associated with the task and computing a match score, the plurality of context graphs derived from the domain ontology and stored along with knowledge in a knowledge repository. Herein, to match the enhanced query graph with a context graph from amongst the plurality of context graphs, the one or more hardware processors are configured by the instructions to compute the match score indicative of a degree of similarity between an ontological context of the task with the ontological context of the knowledge. Also, to compute a match score between the enhanced query graph and a context graph from amongst the plurality of context graphs, the one or more hardware processors are configured by the instructions to use a combination of semantic similarity score and a structural similarity score between each node of the enhanced query graph and corresponding node of the context graph, wherein the semantic similarity score is indicative of conceptual similarity between the node of the query graph and the node of the context graph with respect to the domain ontology, and the structural similarity is indicative of a match between relational contexts of the node of the enhanced query graph and the node of the context graph.

In yet another aspect, a non-transitory computer readable medium for a method for knowledge retrieval using ontology-based context matching is provided. The method includes receiving a query associated with a task, via one or more hardware processors. Further, the method includes deriving a query graph associated with the query from a domain ontology associated with the task, via the one or more hardware processors, the query graph comprising a first plurality of elements indicative of an intent and a context associated with the task, wherein the domain ontology comprises a classification of concepts associated with the task about which knowledge is to be determined. Furthermore, the method includes enhancing information in the query graph by re-classifying one or more elements of the query graph using ontology reasoning and annotating results of re-classifying in the query graph to obtain an enhanced query graph, via the one or more hardware processors. Also, the method includes iteratively matching the enhanced query graph with each of a plurality of context graphs of knowledge for the intent associated with the task and computing a match score, via the one or more hardware processors, the plurality of context graphs derived from the domain ontology and stored along with knowledge in a knowledge repository. Herein, matching the enhanced query graph with a context graph from amongst the plurality of context graphs comprises computing the match score indicative of a degree of similarity between an ontological context of the task with the ontological context of the knowledge. Also, computing a match score between the enhanced query graph and a context graph from amongst the plurality of context graphs comprises using a combination of semantic similarity score and a structural similarity score between each node of the enhanced query graph and corresponding node of the context graph, wherein the semantic similarity score is indicative of conceptual similarity between the node of the query graph and the node of the context graph with respect to the domain ontology, and the structural similarity is indicative of a match between relational contexts of the node of the enhanced query graph and the node of the context graph.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 illustrates a flow chart of a method for knowledge retrieval using ontology-based context matching, in accordance with an example embodiment.

FIG. 6E illustrates a fifth example of domain ontology for knowledge retrieval using ontology-based context matching in accordance with an example embodiment.

FIG. 6F illustrates a sixth example of domain ontology for knowledge retrieval using ontology-based context matching in accordance with an example embodiment.

DETAILED DESCRIPTION

Figure 1:
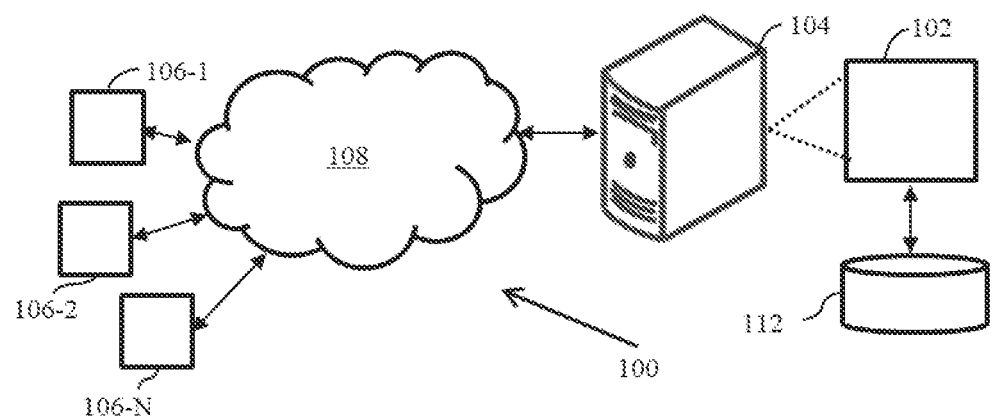
FIG. 1 illustrates an example network implementation of a system for knowledge retrieval using ontology-based context matching according to some embodiments of the present disclosure.

Typical knowledge engineering systems have many challenges with respect to knowledge retrieval. Knowledge is usually generated in a specific context. This context forms an implicit background for the knowledge, and the latter cannot be interpreted correctly without the former. At the same time, the goal of knowledge retrieval is to maximize the reuse of knowledge in as many problem contexts as possible. To balance the aforementioned concerns two things are needed: 1) explicitly modeling the context in which knowledge is generated, and 2) a means to match the problem context with the generative context of knowledge to assess the degree of similarity between the two, which then provides the basis for ranking the suitability of different knowledge elements for the problem context.

Various embodiments of the present disclosure provide method and system that overcomes the aforementioned limitations. For example, the disclosed method and systems facilitates knowledge retrieval using ontology-based context matching. In an embodiment, the disclosed system provides sufficient semantic basis for meaningful context matching and address strict matching problem for supporting the reuse aspect. Further, the system combines semantic and structural similarity, with the help of ontology reasoning, class hierarchy and object similarity for improved knowledge retrieval.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 6F, where similar reference characters denote corresponding features consistently throughout the figures, there are shown preferred embodiments and these embodiments are described in the context of the following exemplary system and/or method.

FIG. 1 illustrates a network implementation 100 of a system 102 for knowledge retrieval using ontology-based context matching, in accordance with an example embodiment. The system 102 may be embodied in a knowledge engine to retrieve most suitable knowledge available in a knowledge repository, based on current problem task and context. The knowledge repository may include knowledge in the form of models, workflows, design templates, design rules, design cases, and so on. Additionally, the knowledge may exist in multiple forms such as models, rules, cases, design templates, documents and so on. The knowledge is intended to serve a certain purpose. It is essential to model this intent space, so as to be able to capture right kind of knowledge for the right purpose. Knowledge is applicable in a certain context. It is essential to capture this context. In various embodiments described herein, the system 102 is able to capture the knowledge in an applicable context.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment.

Figure 2:
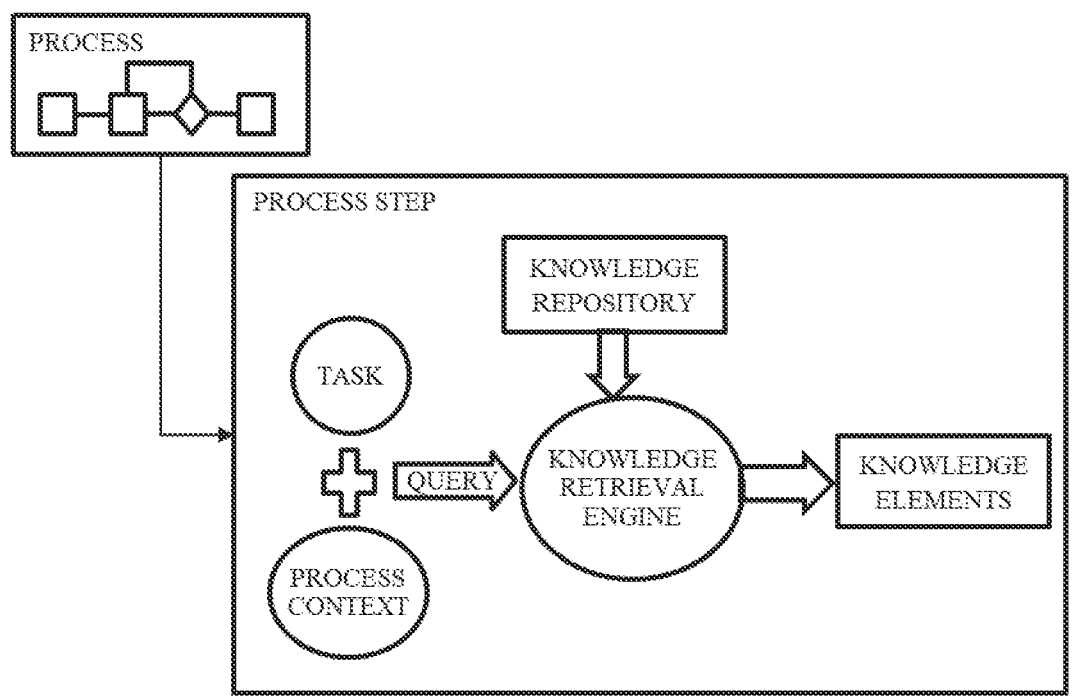
FIG. 2 is a functional block diagram for knowledge retrieval using ontology-based context matching according to some embodiments of the present disclosure.

The system may retrieve most suitable (relevant) knowledge associated with a problem (or a task) from a knowledge repository (associated with a domain), as shown in FIG. 2. In an embodiment, for knowledge retrieval, the disclosed system 102 matches an ontological context of a problem or a task with the ontological contexts of knowledge elements to compute a similarity score. The similarity score indicates a degree of similarity between the problem context and the knowledge element context. An important contribution of the disclosed embodiments is that the disclosed system 102 scores similarity on two dimensions, namely, semantic similarity and structural similarity. The semantic similarity computes the conceptual similarity of the elements being matched. Structural similarity matches the relational contexts of the elements being matched. In an embodiment, the final similarity score is a product of the semantic similarity score and the structural similarity score. In an embodiment, said similarity score may be normalized to [0, 1] range. The similarity score may be '1' when the contexts matches exactly, and the similarity score is '0' when they have nothing in common, and the scores in between indicate the degree of similarity based on which an informed choice can be made on which knowledge elements to retrieve. The process involves ontological reasoning, considers ontology elements at multiple levels of abstraction and uses ontology class hierarchy matching and object similarity techniques, as will be described further with reference to the description below with reference to FIGS. 3-5.

FIG. 3 illustrates a flow chart of a method for knowledge retrieval using ontology-based context matching, in accordance with an example embodiment. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

As previously discussed, knowledge retrieval engine is supposed to retrieve most suitable knowledge available in a knowledge repository, based on current problem task and context thereof.

At 302, the method 300 includes receiving a query associated with a task. The context of the task (or the current problem) may be expressed in terms of an ontology graph, hereinafter referred to as a query graph. The query graph is limited to the knowledge requirements of the current task being carried out. Herein it will be understood that the query may be associated with a specific domain, for instance, manufacturing domain, financial domain, and so on. The knowledge associated with the domain may be captured in a domain ontology. The domain ontology includes a classification of concepts associated with the task about which knowledge is to be determined/retrieved.

The knowledge may be modeled with a context information associated with the knowledge in the domain ontology. For instance, knowledge associated with a domain may be sought in multiple contexts (or situations). Such knowledge may be modeled with context information (i.e. information of multiple contexts) and stored in a knowledge repository. The knowledge modeled with different contexts may be expressed in terms of corresponding ontology graphs, hereinafter referred to as context graphs.

Figure 4A:
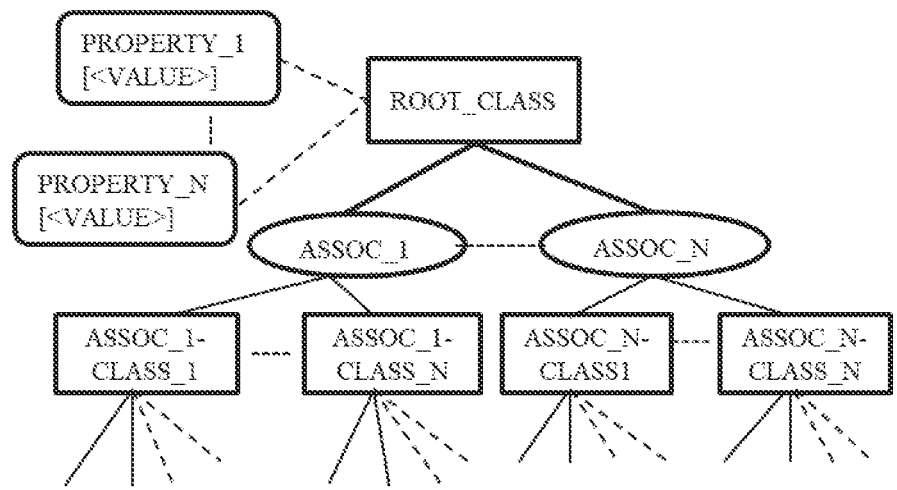
FIG. 4A is a block diagram of a graph structure of a domain ontology for knowledge retrieval using ontology-based context matching according to some embodiments of the present disclosure.
Figure 4B:
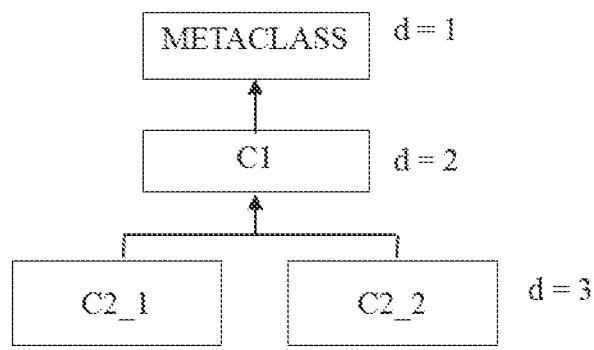
FIG. 4B illustrates an example of the levels of abstraction of elements of query graph and context graphs according to some embodiments of the present disclosure.

Both the context graphs and the query graph are fragments of the same domain ontology. The elements in both these graphs map to the common domain ontology elements, such as classes, meta-classes, properties and associations/relations. The knowledge is also tagged with tasks it is supposed to serve. An example of the same is described in a paper publication titled "A Knowledge Modeling Framework for Computational Materials Engineering", Raghavendra Reddy Yeddula et. al. The query graph and each of the plurality of context graphs includes a plurality of elements at a plurality of distinct levels of abstraction. Said plurality of levels of abstraction associated with the plurality of elements of the query graph and the context graphs may include, but are not limited to, meta-classes, classes, properties, and property values. An example of the levels of abstraction of the elements of query graph and context graphs is illustrated in FIG. 4B.

Upon receiving the query, the knowledge retrieval includes matching of two ontology-based graphs, i.e. the query graph and the context graph of each of the potential knowledge available for the current task.

At 304, the method 300 includes deriving a query graph associated with the query from the domain ontology associated with the task. The query graph may include a first plurality of elements indicative of an intent and a context associated with the task. These elements of the query graph include ontology class/instance nodes. Based on the class definitions of the ontology and an ontological reasoner, a given class or instance in the ontology can be re-classified into one of the other existing ontology classes. The name of this class can also be tagged to the graph node. At 306, information in the query graph is enhanced by re-classifying one or more elements of the query graph using ontology reasoning and annotating results of re-classifying in the query graph to obtain an enhanced query graph.

The query graph is then iteratively matched with each context graph of the potential knowledge available for the current task. At 308, the method 300 includes iteratively matching the enhanced query graph with each of a plurality of context graphs of the knowledge tagged with the intent associated with the task and computing a match score in each iteration of a plurality of iterations. Herein, matching the enhanced query graph with a context graph from amongst the plurality of context graphs includes computing the match score which is indicative of a degree of similarity between an ontological context of the task with the ontological context of the knowledge.

The matching starts with pre-identified root nodes in the two graphs. The query graph drives the matching process. A match score is computed for a node using a combination of semantic similarity score (simSemantic [0-1]) and structural similarity score (simStructure [0-1]). The semantic similarity score is indicative of conceptual similarity between the node of the query graph and the node of the context graph with respect to the domain ontology. The structural similarity is indicative of a match between relational contexts of the node of the enhanced query graph and the node of the context graph.

The Semantic similarity score is computed using ontology concept/class hierarchy. The semantic similarity score is computed using ontology concept/class hierarchy. Computing the semantic similarity score includes comparing depth of the classes represented by the nodes of the enhanced query graph and the context graph in a class hierarchy obtained after merging two or more levels from amongst the plurality of levels of the domain ontology. The merged domain ontology comprises a hierarchy precomputed for a plurality of classes by considering meta-class as the root class and the plurality of instance classes as subclasses of the meta-class. This hierarchy is pre-computed for all the classes in the ontology, by considering meta-classes as the root classes and all classes as subclasses of the meta-classes. In this way, the two ontology levels can be merged. Each class is assigned a depth number in this class hierarchy tree—based on its depth in the class hierarchy tree, starting with depth 1 for the root, as illustrated in FIG. 4B. Any two classes in the ontology class hierarchy are similar based on the following formula:

$$\text{simSemantic}(cls1, cls2) = 2d(\text{LCA}(cls1, cls2))/(d(cls1) + d(cls2))$$

where, LCA(cls1, cls2) represents a latest common ancestor for the two classes in the class hierarchy.

The context graphs can have meta-classes associated with the graph nodes, whereas the query graphs always have class nodes.

The Structural similarity score is computed by considering the structure of the current ontology graph node. Computation of the structural similarity score includes matching of ontology properties/property values associated with the node and matching of other associated nodes (representing other ontology classes/meta-classes) for the current node. And, then a weighted aggregation of these match scores to get the final score for the current node is computed. The node in the query graph is considered the current node, for which a match is searched for in the corresponding knowledge context graph.

The property nodes are matched by considering property matching and value matching—depending on the level of detail available for matching. A property in context graph matches with property in query graph, only if they have exactly the same property names (simProperty=1). The simProperty score reduces if no matching property is found in context graph.

Property value matching considers value (in query graph)–value/range (in context graph) matching. Herein, consider simPropertyValue=1, is considered when the value in query graph matches exactly with the value in context graph or the value in query graph lies in the range specified in the context graph. In case where the value does not exist in the range, the system finds how far it is from the range as below:

Compute absolute distance (D) of value from closest boundary of the range

Normalize the range to 0 mean, the new absolute closest boundary value is now, say B.

$$simPropertyValue = maxOf(B/B+D, threshold\_for\_approx\_value\_match)$$

If value/range is missing in the context graph but value is present in the query graph, simPropertyValue score is reduced by a fuzzy match factor.

The rest of the ontology graph nodes associated with the current node are matched recursively using the same technique above. The match score of these nodes, considers their semantic and structural similarities. Matching ontology associations are traversed identifying candidate associated nodes for matching. If any of the associated nodes does not match exactly, node with highest match score for the current query graph node is assumed to have matched (fuzzy matching) with a reduced score by a fuzzy_match_factor.

The individual associated node match scores are aggregated using a weighted aggregation method. The weights come from the query graph, which in turn are specified as part of intent definition (Ref: Paper publication titled "A Knowledge Modeling Framework for Computational Materials Engineering", Raghavendra Reddy Yeddula et. al.). Thus, $$simStructure(cls1, cls2) = (\Sigma(w(i)*matchScore(cls1\_assoc(i)\_class, cls2\_matching\_assoc\_class)*(fuzzyMatching?fuzzy\_match\_factor:1)) + \Sigma(w(j)*(simProperty(cls1\_property(j), cls2\_matching\_property) + simPropertyValue(cls1\_property(j)\_value,$$

$$cls2\_matching\_property\_value\_or\_range)*(fuzzyMatching?fuzzy\_match\_factor:1))))/(\Sigma w(i)+2*\Sigma w(j))$$

The final match score for the query graph root node is the total match score for the query graph matched with context graph.

$$matchScore(cls1, cls2) = simSemantic(cls1, cls2)*simStructure(cls1, cls2)$$

Figure 5:
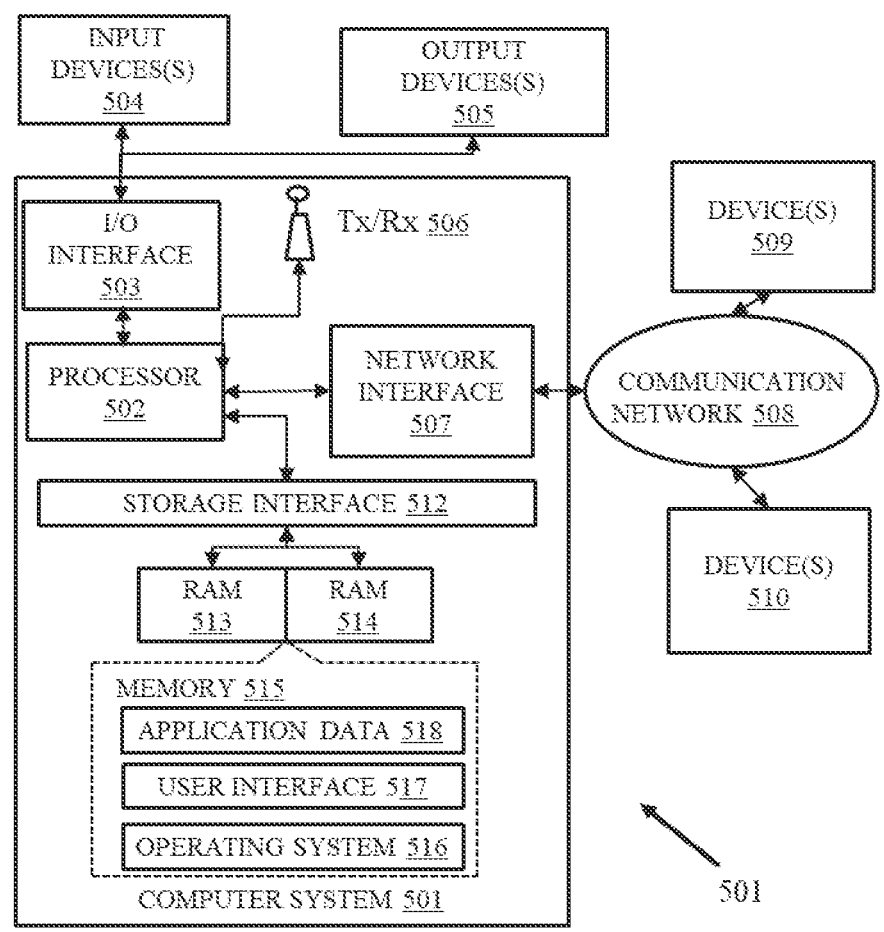
FIG. 5 is a block diagram of an exemplary computer system for implementing embodiments consistent with the present disclosure.

FIG. 5 is a block diagram of an exemplary computer system 501 for implementing embodiments consistent with the present disclosure. The computer system 501 may be implemented in alone or in combination of components of the system 102 (FIG. 1). Variations of computer system 501 may be used for implementing the devices included in this disclosure. Computer system 501 may comprise a central processing unit ("CPU" or "hardware processor") 502. The hardware processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 502 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 502 may be a multi-core multi-threaded processor.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 505 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of programs or database components, including, without limitation, an operating system 516, user interface application 517, user/application data 518 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 501 may store user/application data 318, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, (the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Example Scenario

Figure 6A:
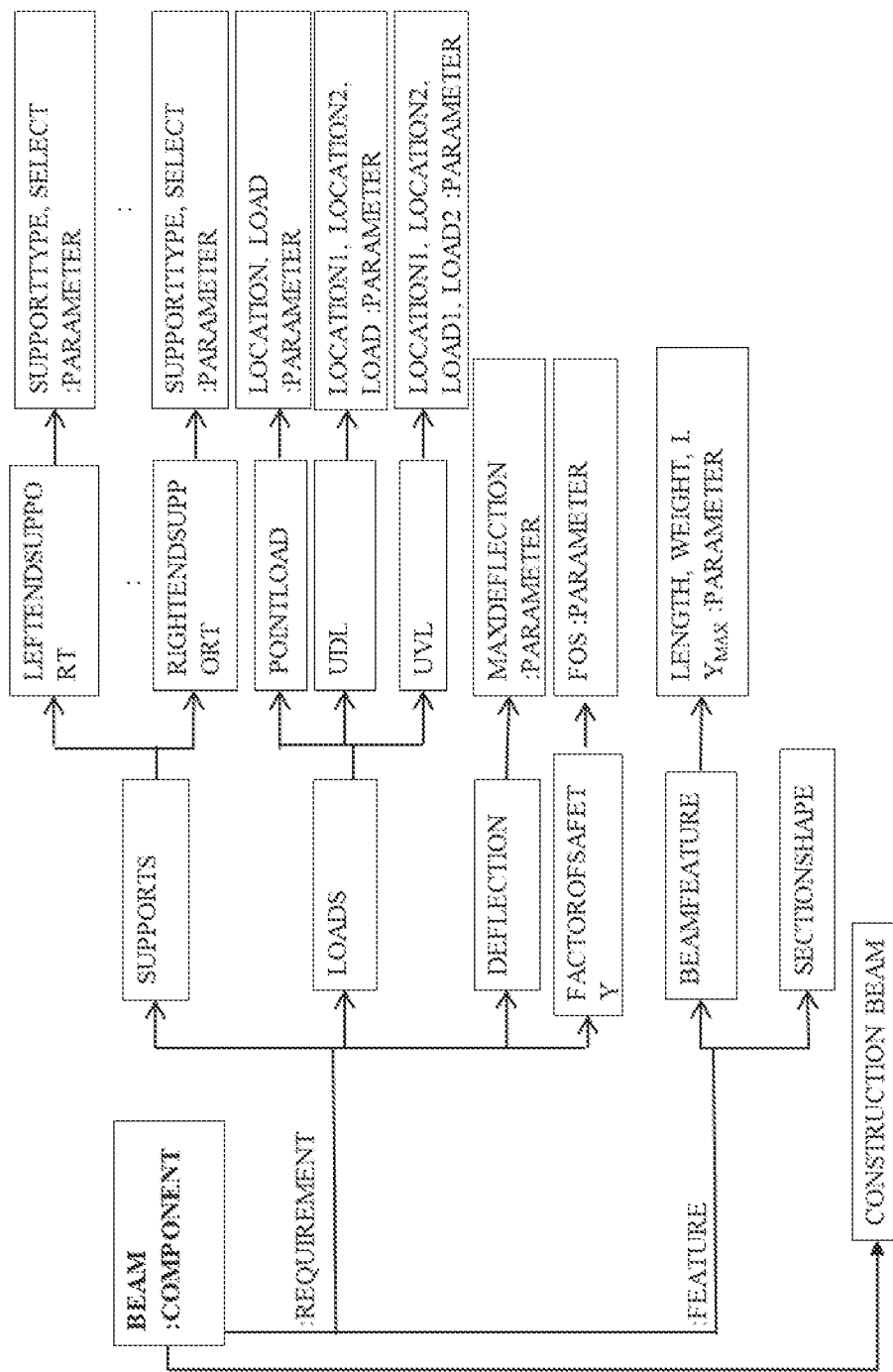
FIG. 6A illustrates a first example of domain ontology for knowledge retrieval using ontology-based context matching in accordance with an example embodiment.

FIG. 6A shows part of domain ontology for beams used in construction of various types of structures. It will be noted that FIG. 6A shows only an instance (subject ontology) of a meta-model that describes the abstract concepts in the domain, such as 'Component', 'Requirement', 'Feature', along with their inter-relationships. The domain ontology is organized using such multiple levels of abstractions.

Figure 6B:
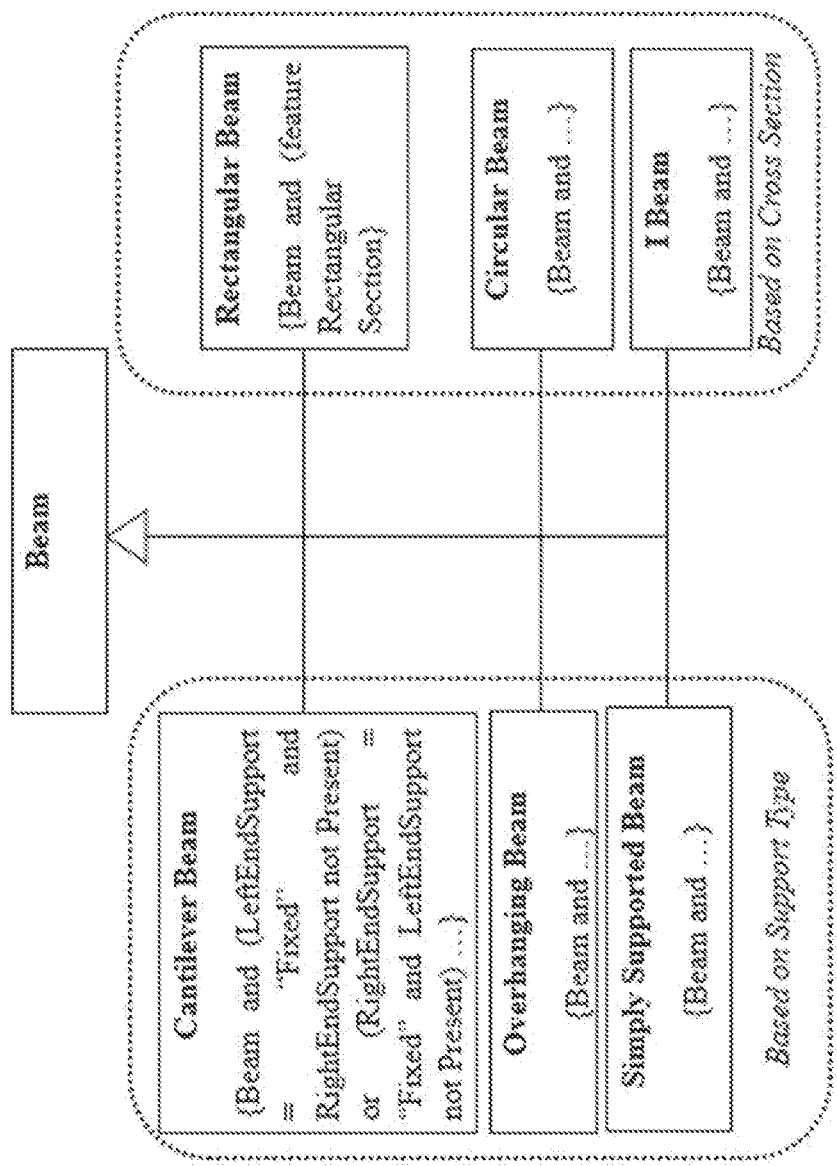
FIG. 6B illustrates a second example of domain ontology for knowledge retrieval using ontology-based context matching in accordance with an example embodiment.

A base Beam class is shown here, along with its requirements, sub-requirements, features and their respective parameters. A new class can be created, with Beam as the base class, as shown here ("Construction Beam"). FIG. 6B shows well known classes in this domain, along with their ontological class definitions. E.g. a "Rectangular Beam" is a special type of beam having a specific type of feature "RectangualSection" associated with it. Such definitions help in re-classification of instances or classes into other existing classes with the help of ontology reasoners.

Figure 6C:
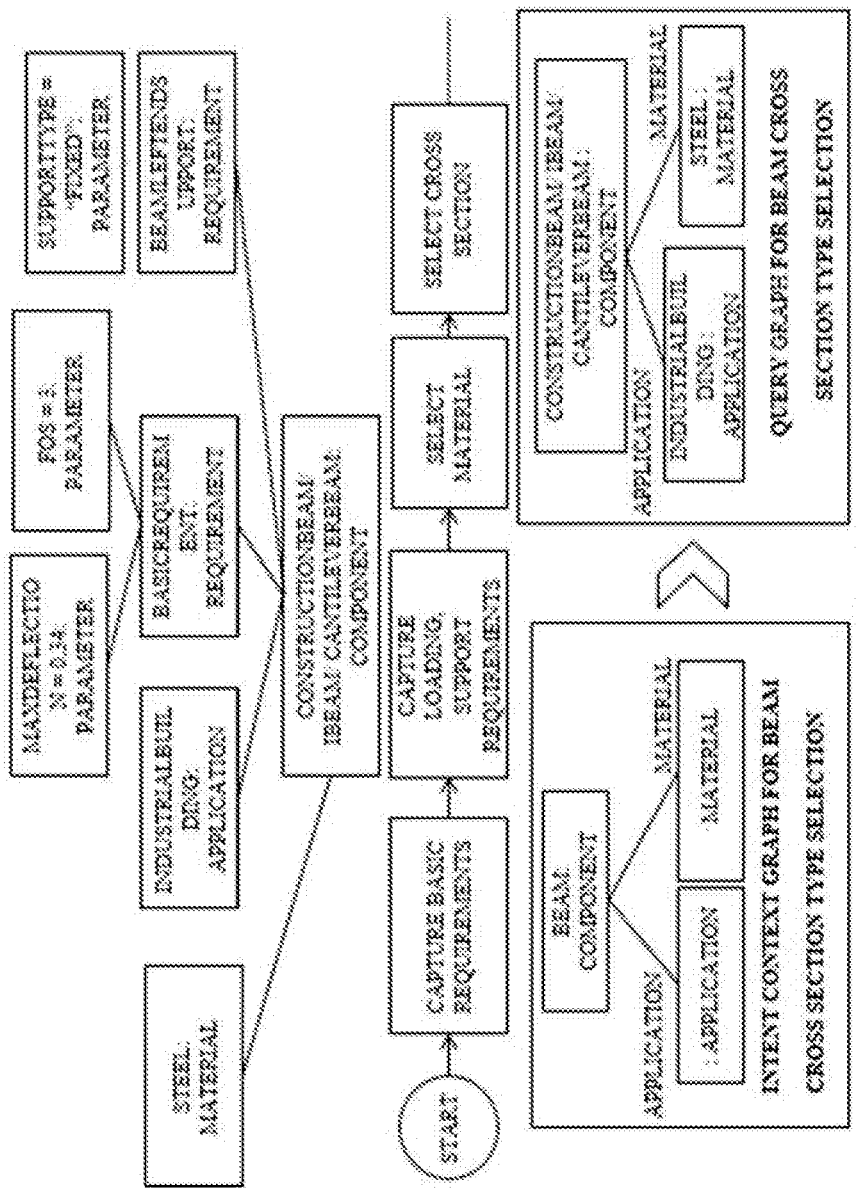
FIG. 6C illustrates a third example of domain ontology for knowledge retrieval using ontology-based context matching in accordance with an example embodiment.

FIG. 6C shows how the ontology of FIG. 6A is used for representing a process context as well as intent definition. As shown in FIG. 6C, as part of a process execution, process context gets built. In this case, a "Construction Beam" instance is created and is associated with specific requirement values, such as FoS=3, Max Deflection=0.34, Support type="Fixed". All of this becomes part of the process context—which essentially is an instance of subject ontology.

At this point of time, it can be inferred that the instance of "Construction Beam" also is an instance of "Cantilever Beam"—with the help of ontology reasoning based on the class definition of "Cantilever Beam" and current instance configuration. This information is used to enhance the generated query graph as explained later.

The process task "Select Cross Section", has an intent associated with it, "Beam cross section type selection". The process context along with the intent definition, which includes intent context graph, is used to create a query graph as shown in FIG. 6C. As can be seen, the intent context graph is created with reference to the domain ontology at multiple levels—class "Beam", meta-classes "Material" and "Application" are used. Similarly, properties can also be used. The nodes and the associations may also have weights attached—those are transferred to the query graph. The query graph essentially instantiates the intent context graph with process context data. Thus, as shown in FIG. 6C, in the query graph, "Application" meta-class node is replaced by the class "Industrial Building", class node "Beam" is replaced by "Construction Beam" node, annotated with the alternative "Cantilever Beam" class and so on. Property nodes in query graph are also populated with values from process context.

Figure 6D:
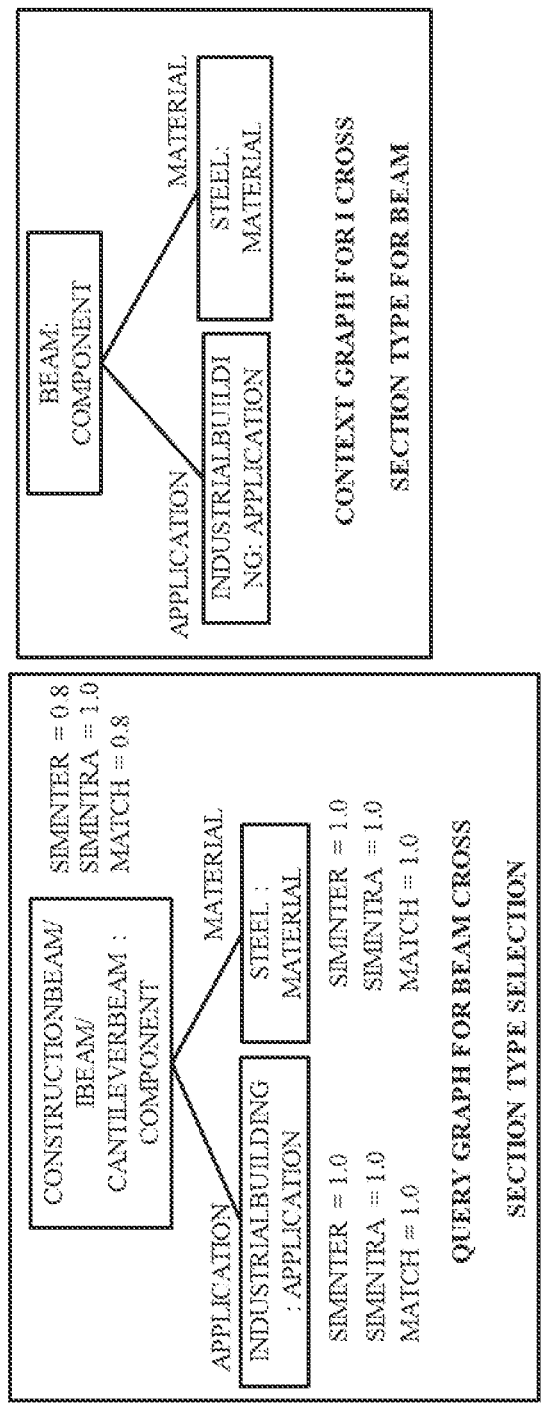
FIG. 6D illustrates a fourth example of domain ontology for knowledge retrieval using ontology-based context matching in accordance with an example embodiment.

This query graph is compared to the context graphs of knowledge elements available for the task intent "Beam cross section type selection", in the knowledge repository. As shown in FIGS. 6D and 6F.

As explained, this comparison involves computing two scores, viz. semantic similarity and structural similarity, for every node of query graph. A recursive node to node comparison starting from the root of both the trees is carried out. A match score for a node is combination of the both the scores. Final match score is the match score for the root node of query graph.

As explained earlier, the semantic similarity for two nodes is computed based on the ontology entities that the nodes map to. As shown in FIG. 6E, a single class hierarchy is created by combining the meta-class and classes together. "Component" meta-class is considered a base class for all instances of "Component". The semantic similarity is then based on where the two classes, to be compared, are placed in this class hierarchy.

$$simSem(cls1, cls2) = 2*d(LCA)/(d(cls1)+d(cls2))$$

In FIGS. 6D and 6F, "Beam", in the context graph, and "Construction Beam", in the query graph, are compared for semantic similarity as below:

$$simSem(Beam, Construction\ Beam) = 2*d(Beam)/(d(Beam)+d(Construction\ Beam)) = 2*2/(2+3) = 0.8$$

The structural similarity is essentially a weighted average of match scores of related/associated nodes to the current node. The weights are transferred from the intent definition (default 1). This involves recursive computation of match scores for the related nodes. Nodes with no related nodes are considered to have structural similarity score as 1. An example of specification of weights is described in a paper title "A Knowledge Modeling Framework for Computational Materials Engineering", Raghavendra Reddy Yeddula et. al.

$$simStr(cls1,cls2) = (\Sigma w(i)*assoc(i)\_match\_score + \Sigma w(j)*property(j)\_match\_score)/(\Sigma w(i) + \Sigma w(j))$$

Structural similarity for "Beam" and "Construction Beam" in FIG. 6D is computed as shown below.

$$simStr(Beam, Construction\ Beam) = (\Sigma(1.0*1.0 + 1.0*1.0) + \Sigma 0)/(2.0) = 1.0$$

Structural similarity for "Beam" and "Construction Beam" in FIG. 6F is computed as shown below.

$$simStr(Beam, Construction\ Beam) = (\Sigma(1.0*0.5 + 1.0*0.5) + \Sigma 0)/(2.0) = 0.5$$

The final match score for a node is product of semantic similarity and structural similarity scores.

$$match(cls1,cls2) = simSem*simStr$$

In the present example, the score for each node is shown in FIG. 6D and FIG. 6F. The match score for the root node is the final match score for the query graph and context graph.

The context graph in FIG. 6D matches better with the query graph (final match score 0.8) than the context graph in FIG. 6F (final match score 0.4). As can be seen in FIG. 6F, a low semantic similarity score for related nodes drags down the final score for the root node, despite having decent structural similarity scores. Thus, the knowledge associated with the context graph in FIG. 6D is ranked higher and is deemed to be more suitable for the current process context.

Figure 6G:
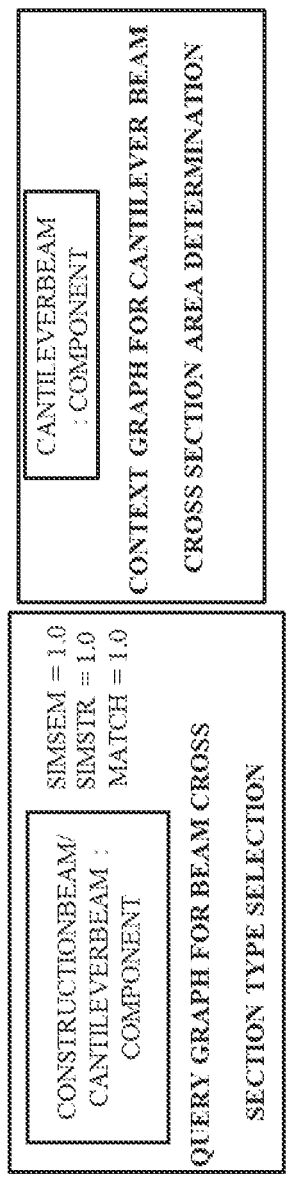
FIG. 6G illustrates a seventh example of domain ontology for knowledge retrieval using ontology-based context matching in accordance with an example embodiment.

FIG. 6G shows another example of a different query graph and context graph. The query graph, shown here, includes only one node, as the necessary information required to select knowledge for determining cross section area is generally only limited to the type of beam (as per the corresponding intent definition). In this case, the node in the query graph maps to "Construction Beam" as well as the alternative "Cantilever Beam" class. The context graph node, shown in the figure, on the other hand, is mapped to "Cantilever Beam". Note that if the query graph node is not enhanced with the additional inferred class information, as explained earlier, only "Construction Beam" would be compared with "Cantilever Beam". This would have reduced the match score to 0.67. However, since the alternative "Cantilever Beam" class is also added for the node in the query graph, this matches perfectly with the context graph node and the final match score is 1.0. Thus, due to the inference provided by ontology reasoner, the knowledge associated with "Cantilever Beam" can also be utilized for this task in the process, despite the process context not having an explicit instance of "Cantilever Beam".

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclose methods and systems for knowledge retrieval using ontology-based context matching. The disclosed method and system are capable of explicitly modeling the context in which knowledge is generated, and match the problem context with the generative context of knowledge to assess the degree of similarity between the two, which then provides the basis for ranking the suitability of different knowledge elements for the problem context.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving a query associated with a task, via one or more hardware processors;
   deriving a query graph associated with the query from a domain ontology associated with the task, via the one or more hardware processors, the query graph comprising a first plurality of elements indicative of an intent and a context associated with the task, wherein the domain ontology comprises a classification of concepts associated with the task about which knowledge is to be retrieved;
   re-classifying one or more elements of the query graph using ontology reasoning to enhance information in the query graph, via the one or more hardware processors;
   annotating the query graph with the results of re-classifying to obtain an enhanced query graph, via the one or more hardware processors; and
   iteratively matching the enhanced query graph with each of a plurality of context graphs of knowledge for the intent associated with the task and computing a match score, via the one or more hardware processors, wherein the match score is indicative of a degree of similarity between an ontological context of the task with the ontological context of the knowledge the plurality of context graphs derived from the domain ontology and stored along with knowledge in a knowledge repository, and
   wherein matching the enhanced query graph with a context graph from amongst the plurality of context graphs comprises computing the match score, and
   wherein computing a match score between the enhanced query graph and a context graph from amongst the plurality of context graphs comprises using a combination of semantic similarity score and a structural similarity score between each node of the enhanced query graph and corresponding node of the context graph, wherein the semantic similarity score is indicative of conceptual similarity between the node of the query graph and the node of the context graph with respect to the domain ontology, and the structural similarity is indicative of a match between relational contexts of the node of the enhanced query graph and the node of the context graph, wherein computing the structural similarity score between the node of the enhanced query graph and the node of the context graph node comprises:
   determining an approximate similarity of property value by computing an absolute distance (D) of the property value represented by the node of enhanced query graph from closest boundary of a range represented by the node of the context graph and normalizing the range to zero mean such to obtain an updated absolute closest boundary value (B);
   computing a property value similarity score between the node of the enhanced query graph node and the context graph node based on an equation:

$$simPropertyValue = maxOf(B/B+D, \text{threshold for approx value match}),$$

wherein on determination that the range is missing in the context graph and the property value is present in the enhanced query graph, reducing the property value similarity score by a fuzzy match factor.

2. The processor-implemented method of claim 1, wherein each of the query graph and the plurality of context graphs comprises a plurality of elements at a plurality of distinct levels of abstraction, and wherein the plurality of levels of abstraction associated with the plurality of elements comprises meta-classes, classes, properties, and property values.

3. The processor-implemented method of claim 1, wherein computing the structural similarity score between the node of the enhanced query graph and the node of the context graph node comprises:
   recursively matching related nodes representing properties, property values, classes or meta-classes for the enhanced query graph node to obtain a set of match scores; and
   computing weighted aggregation of the set of match scores to obtain an aggregated match score for the enhanced query graph node.

4. The processor-implemented method of claim 1, wherein on determination of a mismatch between the class names of nodes of the enhanced query graph and the context graph, reducing a match score between the node of the query graph and the node of the context graph that is associated with a highest match score, wherein the match score is reduced by a fuzzy match factor.

5. The processor-implemented method of claim 1, wherein computing the semantic similarity score comprises comparing depth of the classes represented by the nodes of the enhanced query graph and the context graph in a class hierarchy obtained after merging two or more levels from amongst the plurality of levels of the domain ontology, wherein the merged domain ontology comprises a hierarchy precomputed for a plurality of classes by considering meta-class as the root class and the plurality of instance classes as subclasses of the meta-class.

6. The processor-implemented method of claim 1, wherein the match score is a product of the semantic similarity score and the structural similarity score.

7. A system, comprising:
   a memory storing instructions;
   one or more communication interfaces; and
   one or more hardware processors coupled to the memory via the one or more communication interfaces, wherein the one or more hardware processors are configured by the instructions to:
   receive a query associated with a task;

derive a query graph associated with the query from a domain ontology associated with the task, the query graph comprising a first plurality of elements indicative of an intent and a context associated with the task, wherein the domain ontology comprises a classification of concepts associated with the task about which knowledge is to be retrieved;

re-classify one or more elements of the query graph using ontology reasoning to enhance information in the query graph;

annotate the query graph with results of the re-classifying to obtain an enhanced query graph; and iteratively match the enhanced query graph with each of a plurality of context graphs of knowledge for the intent associated with the task and computing a match score, the plurality of context graphs derived from the domain ontology and stored along with knowledge in a knowledge repository, wherein to match the enhanced query graph with a context graph from amongst the plurality of context graphs, the one or more hardware processors are configured by the instructions to computing the match score indicative of a degree of similarity between an ontological context of the task with the ontological context of the knowledge, and wherein to compute a match score between the enhanced query graph and a context graph from amongst the plurality of context graphs, the one or more hardware processors are configured by the instructions to use a combination of semantic similarity score and a structural similarity score between each node of the enhanced query graph and corresponding node of the context graph, wherein the semantic similarity score is indicative of conceptual similarity between the node of the query graph and the node of the context graph with respect to the domain ontology, and the structural similarity is indicative of a match between relational contexts of the node of the enhanced query graph and the node of the context graph wherein the one or more hardware processors are configured by the instructions to further configured by the instructions to:

determine an approximate similarity of property value by computing an absolute distance (D) of the property value represented by the node of enhanced query graph from closest boundary of a range represented by the node of the context graph and normalizing the range to zero mean such to obtain an updated absolute closest boundary value (B);

compute a property value similarity score between the node of the enhanced query graph node and the context graph node based on an equation:

$$simPropertyValue = maxOf(B/B+D, threshold\ for\ approx\ value\ match),$$

wherein on determination that the range is missing in the context graph and the property value is present in the enhanced query graph, reducing the property value similarity score by a fuzzy match factor.

8. The system of claim 7, wherein each of the query graph and the plurality of context graphs comprises a plurality of elements at a plurality of distinct levels of abstraction, and wherein the plurality of levels of abstraction associated with the plurality of elements comprises meta-classes, classes, properties, and property values.

9. The system of claim 7, wherein to compute the structural similarity score between the node of the enhanced query graph and the node of the context graph node, the one or more hardware processors are configured by the instructions to:

recursively match related nodes representing properties, property values, classes or meta-classes for the enhanced query graph node to obtain a set of match scores; and compute weighted aggregation of the set of match scores to obtain an aggregated match score for the enhanced query graph node.

10. The system of claim 7, wherein on determination of a mismatch between the class names of nodes of the enhanced query graph and the context graph, the one or more hardware processors are configured by the instructions to reduce a match score between the node of the query graph and the node of the context graph that is associated with a highest match score, wherein the match score is reduced by a fuzzy match factor.

11. The system of claim 7, wherein to compute the semantic similarity score, the one or more hardware processors are configured by the instructions to compare depth of the classes represented by the nodes of the enhanced query graph and the context graph in a class hierarchy obtained after merging two or more levels from amongst the plurality of levels of the domain ontology, wherein the merged domain ontology comprises a hierarchy precomputed for a plurality of classes by considering meta-class as the root class and the plurality of instance classes as subclasses of the meta-class.

12. The system of claim 7, wherein the match score is a product of the semantic similarity score and the structural similarity score.

13. One or more non-transitory machine-readable information storage mediums comprising one or more instructions which when executed by one or more hardware processors cause:

receiving a query associated with a task;

deriving a query graph associated with the query from a domain ontology associated with the task, via the one or more hardware processors, the query graph comprising a first plurality of elements indicative of an intent and a context associated with the task, wherein the domain ontology comprises a classification of concepts associated with the task about which knowledge is to be retrieved;

re-classifying one or more elements of the query graph using ontology reasoning to enhance information in the query graph, via the one or more hardware processors;

annotating the query graph with results of the re-classifying to obtain an enhanced query graph, via the one or more hardware processors; and iteratively matching the enhanced query graph with each of a plurality of context graphs of knowledge for the intent associated with the task and computing a match score, via the one or more hardware processors, wherein the match score is indicative of a degree of similarity between an ontological context of the task with the ontological context of the knowledge the plurality of context graphs derived from the domain ontology and stored along with knowledge in a knowledge repository, and wherein matching the enhanced query graph with a context graph from amongst the plurality of context graphs comprises computing the match score, and wherein computing a match score between the enhanced query graph and a context graph from amongst the plurality of context graphs comprises using a combination of semantic similarity score and a structural similarity score between each node of the enhanced query graph and corresponding node of the context graph, wherein the semantic similarity score is indicative of conceptual similarity between the node of the query graph and the node of the context graph with respect to the domain ontology, and the structural similarity is indicative of a match between relational contexts of the node of the enhanced query graph and the node of the context graph, wherein computing the structural similarity score between the node of the enhanced query graph and the node of the context graph node comprises:

determining an approximate similarity of property value by computing an absolute distance (D) of the property value represented by the node of enhanced query graph from closest boundary of a range represented by the node of the context graph and normalizing the range to zero mean such to obtain an updated absolute closest boundary value (B);

computing a property value similarity score between the node of the enhanced query graph node and the context graph node based on an equation:

simPropertyValue=maxOf($B/\bar{B}+D$,threshold for approx value match), wherein on determination that the range is missing in the context graph and the property value is present in the enhanced query graph, reducing the property value similarity score by a fuzzy match factor.

14. The one or more non-transitory machine-readable information storage mediums of claim 13, wherein each of the query graph and the plurality of context graphs comprises a plurality of elements at a plurality of distinct levels of abstraction, and wherein the plurality of levels of abstraction associated with the plurality of elements comprises meta-classes, classes, properties, and property values.

15. The one or more non-transitory machine-readable information storage mediums of claim 13, wherein computing the structural similarity score between the node of the enhanced query graph and the node of the context graph node comprises:

recursively matching related nodes representing properties, property values, classes or meta-classes for the enhanced query graph node to obtain a set of match scores; and computing weighted aggregation of the set of match scores to obtain an aggregated match score for the enhanced query graph node.

16. The one or more non-transitory machine-readable information storage mediums of claim 13, wherein on determination of a mismatch between the class names of nodes of the enhanced query graph and the context graph, reducing a match score between the node of the query graph and the node of the context graph that is associated with a highest match score, wherein the match score is reduced by a fuzzy match factor.

17. The one or more non-transitory machine-readable information storage mediums of claim 13, wherein computing the semantic similarity score comprises comparing depth of the classes represented by the nodes of the enhanced query graph and the context graph in a class hierarchy obtained after merging two or more levels from amongst the plurality of levels of the domain ontology, wherein the merged domain ontology comprises a hierarchy precomputed for a plurality of classes by considering meta-class as the root class and the plurality of instance classes as subclasses of the meta-class, and wherein the match score is a product of the semantic similarity score and the structural similarity score.

* * * * *